Figure 4:
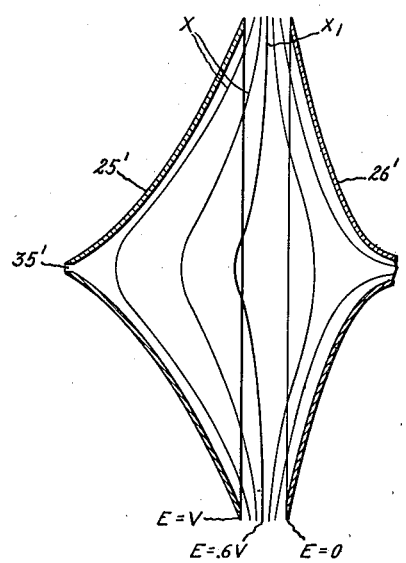

July 7, 1942.   S. RAMO   2,289,071
ELECTRON LENS
Filed Oct. 3, 1941   2 Sheets-Sheet 1
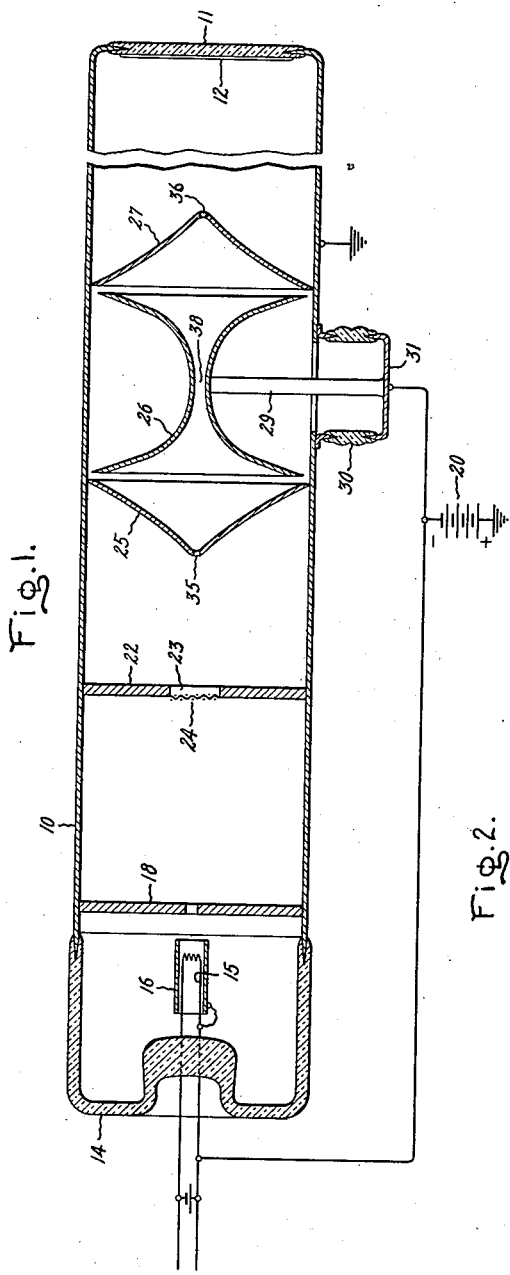
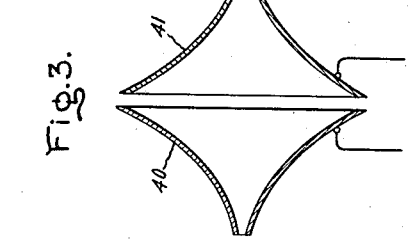
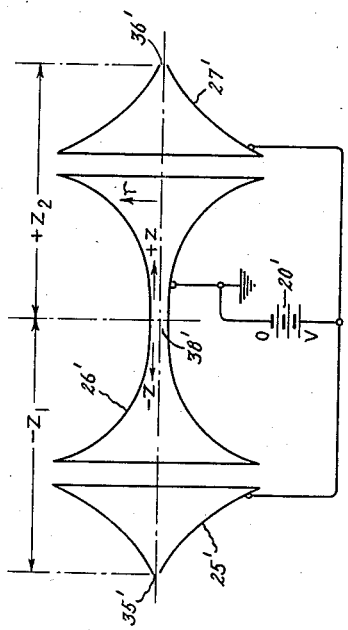
Inventor:
Simon Ramo,
by Harry E. Dunham
His Attorney.

July 7, 1942.   S. RAMO   2,289,071
ELECTRON LENS
Filed Oct. 3, 1941   2 Sheets-Sheet 2

Inventor:
Simon Ramo,
by Harry E. Dunham
His Attorney.

Patented July 7, 1942

2,289,071

UNITED STATES PATENT OFFICE 2,289,071

ELECTRON LENS

Simon Ramo, Schenectady, N. Y., assignor to General Electric Company, a corporation of New York Application October 3, 1941, Serial No. 413,414

4 Claims. (Cl. 250—49.5)

The present invention relates to an improved electron lens.

It is known that the component rays of an electron beam can be focused by the action of apertured electrodes spaced along the beam path and supplied with suitable potentials, this combination being appropriately designated an "electron lens." The focusing produced by such a lens is a function of the strength and form of the electrostatic fields existing between the various lens electrodes and is strikingly analogous to the focusing of a light beam by an optical lens. It has been usefully employed in one instance in the so-called electron microscope, which is an apparatus for obtaining a greatly enlarged electron-optical image of a minute object desired to be investigated.

In electron microscope construction it is frequently desirable that the electron-transmitting aperture of at least one of the lens electrodes be extremely small. This condition may be dictated, for example, by the consideration that it is undesirable that the "field" of the lens shall extend out of the lens space into an external region where its shape and consequent reaction on the electron stream may be adversely affected by the proximity of other charged conductors embodied in the apparatus.

The use of a small aperture occasions no difficulty as long as the aperture is of perfectly symmetrical characaer. Unfortunately, however, in the case of apertures on the order of a few mils in diameter, mechanical considerations make it difficult, if not impossible, to realize perfect symmetry. In a situation in which an asymmetrical configuration of the electrode aperture is involved, objectionable aberrations may exist in the image produced by the lens as a whole because of distorted lens effects occurring within the aperture itself. These effects may in some cases be of such magnitude as seriously to impair the usefulness of the lens.

It is an object of the present invention to provide an improved electron lens construction in which the various electrode apertures, or at least some of them, are rendered substantially free of lens effects so that minor construction aberrations will have no adverse influence on the operation of the lens. This is accomplished, as will appear more fully hereinafter, by choice of an appropriate configuration of the surfaces of the various co-acting lens elements. In a typical embodiment the opposed surfaces of the lens electrodes are relatively closely spaced at regions displaced from the common center line of the electrodes and are increasingly recessive with respect to one another as the center line is approached. In the preferred case the generatrices of the various surfaces of the electrodes are defined by mathematical relationships which are set forth and explained in the following.

Figure 5:
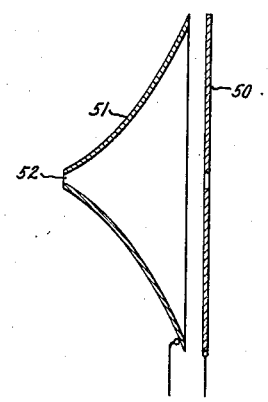
Figure 6:
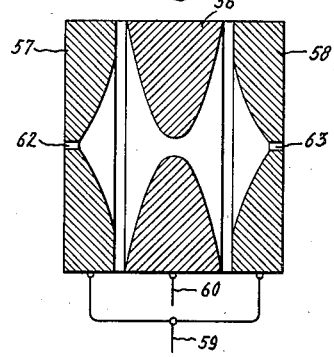

The features which I desire to protect herein are pointed out with particularity in the appended claims. The invention itself, together with further objects and advantages thereof, may best be understood by reference to the following desciption taken in connection with the accompanying drawings in which Fig. 1 is a longitudinal sectional view of an electron microscope suitably embodying the invention; Fig. 2 is a diagrammatic representation useful in explaining the invention; Fig. 3 illustrates a modification of the invention; Fig. 4 is a representation provided to explain a further modification of the invention which is shown in Fig. 5; and Fig. 6 illustrates a still further modification of the invention.

Referring particularly to Fig. 1 there is shown an electron microscope comprising an elongated vacuum-tight container which consists mainly of a cylindrical metal part 10. At one end the container is closed by a glass window 11 having a fluorescent material 12 on its inner surface, and at the other end of the container there is provided a glass insulator 14 which serves to support an electron source in the form of a cathode 15. The cathode is surrounded by a tubular metal member 16 which confines the emitted electrons to a narrow beam and is co-operatively positioned with respect to an apertured diaphragm 18 which is in contact with the main envelope part 10. In the normal use of the apparatus the envelope 10 and the apertured electrode 18 are maintained at ground potential, while the cathode is maintained at several thousand volts below ground potential (e. g. by connection to a potential source 20), so that electrons emitted from the cathode are projected toward the fluorescent screen 12.

In using the apparatus as an electron microscope it is desired to cause the electron stream proceeding from the cathode 15 to produce in the plane of the screen 12 an enlarged electron-optical image of a minute object to be investigated. To this end there is provided a suitable means for supporting an object of the type in question in the path of the electron stream, such means being illustrated in the present case as a metal diaphragm 22 provided with a central opening 23 and having a fine mesh screen 24 covering this opening. The object to be investigated (not shown) is applied to the screen 24 in a region overlying a screen opening which is traversed by the longitudinal axis of the microscope. The introduction of the object is accomplished through a suitable vacuum-lock (not shown) provided in a wall of the microscope, and the microscope is thereafter evacuated by connection to an appropriate pumping system.

Between the object support 22 and the selected imaging plane (i. e. the screen 12) there is provided an electron lens for exerting refractive forces on the electron rays proceeding from the object. In the embodiment illustrated in Fig. 1 this lens comprises a series of three apertured electrodes 25, 26 and 27, these being of a particular configuration determined in a manner to be set forth in the following.

The electrodes 25 and 27 are of substantially identical form and are both supported directly from the main envelope part 10 so as to be at the same potential as that part. The central electrode 26 is insulatingly supported by the combintion of a heavy conductor 29 and a vitreous insulating cylinder 30. A metallic disk 31 which is peripherally sealed to the cylinder 30 and which is centrally joined to the conductor 29 provides an externally accessible terminal for connecting the electrode 26 to the potential source 20. By establishing a potential difference between the electrode 26 and the electrodes 25 and 27, lens fields are set up in the interelectrode spaces of such character as to focus a magnified image of the object under investigation on the screen 12.

The electrodes 25 and 27 are provided centrally with circular apertures 35 and 36 which are adapted to permit the transmission of the electron beam through the lens system. These apertures, which are in alignment with a central opening 38 formed in the electrode 26, are preferably of very small diameter, say on the order of a few mils, this being important because the apertures are the "lens stops" of the electron-optical system, limiting the distance of electrons from the axis and thus minimizing certain abberations, such as spherical and chromatic abberrations. Because of constructional difficulties in producing perfectly circular openings of the size specified, it may be assumed that the openings 35 and 36 are at least to some degree assymmetrical, and it is a primary concern of the present invention to assure that this asymmetry shall not adversely affect the operation of the lens.

In conventional lens constructions, for example in constructions employing planar disks as electrode elements, the differing field conditions which exist on opposite sides of at least certain of the electrodes assure the existence of a lens field within the apertures of these electrodes. Where the apertures are extremely small and are consequently made imperfectly symmetrical, the aperture lens is correspondingly asymmetrical and has the effect of introducing objectionable distortion into the lens image. In accordance with the present invention, however, this difficulty is avoided, in spite of the use of small electrode apertures, by the employment of a lens configuration which is adapted to assure zero field intensity in the region of the apertures so that no aperture lens effect is realized. The electrode construction which is preferably employed in this connection is illustrated in Fig. 1. The procedure by which this construction is determined may be best explained by reference to the following analysis considered in connection with the diagrammatic representation of Fig. 2.

In the figure last referred to there is shown an electrode system comprising a central electrode 26' and complementary electrodes 25' and 27' on opposite sides of the central electrode. The complementary electrodes have centrally disposed apertures 35' and 36', each spaced a distance $z_1$ from the central transverse plane of the lens. The central electrode is assumed to be maintained at zero or ground potential and the electrodes 25' and 27' are at a common potential V, established, for example, by a battery 20'. The regions outside the lens, that is, to the left of 25' and to the right of 27', are assumed to be field-free regions. It is desired to determine the configuration of the various electrodes such that the field at and within the apertures 35' and 36' shall be zero.

The equation which determines electric field distribution in an axially symmetrical system of the type represented is, in one form—

$$\frac{\delta^2 \phi}{\delta r^2} + \frac{1}{r} \frac{\phi}{2r} + \frac{\delta^2 \phi}{\delta z^2} = 0 \qquad (1)$$

where $\phi$ is the electrostatic potential, $r$ is radial distance from the central axis of the lens, and $z$ is the distance along the lens axis, being measured as positive to the right of the central plane of the lens and as negative to the left of such plane.

A solution of this equation which is useful in the present connection is as follows:

$$\phi = A + B \cos wz \, J_0(iwr) \qquad (2)$$

where A, B and $w$ are arbitrary constants.

The axial electric field on the axis, being proportional to $$\frac{\delta \phi}{\delta z}$$

evaluated at $r=0$ (where $J_0(iwr)=1$), is proportional to sin $wz$. Thus if the apertures 35' and 36' which are located at $z = \pm z$ are to be at points of zero electric field, $w$, being an arbitrary constant, should be so chosen that $wz$ is equal to $\pi$, since under these conditions sin $wz$ becomes zero.

As a further limiting condition we may note that the potential $\phi$ must, with the arrangement illustrated, be equal to V over the entire surface of the electrodes 25' and 27' including the minute aperture regions existing at $z = \pm z_1$, $r=0$. Hence from Equation 2 we have at these points $\phi = V = A + B \cos w(\pm z_1)$. However, as we have previously specified $wz_1$ as equal to $\pi$, we have $$\cos w(\pm z_1) = -1 \qquad (3)$$

and $$B = A - V$$

Substituting Equation 4 in Equation 2, the potential function in the regions between the electrodes 25' and 27' and the electrode 26' becomes $$\phi = A + [A - V]\left[\cos \frac{\pi}{z_1} z\right]\left[J_0\left(i\frac{\pi}{z_1} r\right)\right] \qquad (5)$$

The equation which describes the required surfaces for the electrodes 25' and 27' is obtained by putting $\phi = V$ in Equation 5, since with the circuit connections indicated this is a condition which must be fulfilled over the entire surfaces of the specified electrodes. Making this substitution and solving in terms of $z$ and $r$ we have as a common equation for the generatrices of the surfaces of 25' and 27'

$$\cos \frac{\pi}{z_1} z \cdot J_0\left(i\frac{\pi}{z_1}r\right) = -1 \qquad (6)$$

The equation for the surface of the electrode 26' (which is postulated as being at zero potential) is obtained by putting $\phi=0$ in Equation 5. Thus the equation for the generatrix of the surface of electrode 26' becomes $$\cos \frac{\pi}{z_1} z \cdot J_0\left(i\frac{\pi}{z_1}r\right) = \frac{A}{V-A} \qquad (7)$$

Practical considerations show that the arbitrary constant A must be limited to values between $$A = V \text{ and } A = \frac{V}{2}$$

At the former value the size of the opening 38 becomes infinite, whereas at the latter value the opening is completely closed. Obviously, neither one of these conditions represents a practical construction, so that some intermediate value of A must be chosen.

It is apparent that since the quantity A is quite arbitrary (within the limits specified), there are many choices for the exact shaping of electrode 26'. The construction represented in Fig. 2 illustrates approximately the configuration which would be obtained by choosing A as equal to .55V. Had a different value of A been chosen, a different curvature for 26' would have resulted, although the general shape of the electrode would have been the same.

Electrodes 25' and 27' are independent of A and therefore have a shape which is uniquely determined once the spacing factor $z_1$ is chosen. This latter quantity may take any value, subject to the obvious limitation that the dimensions of the lens system as a whole must be kept within practical bounds.

To determine the appropriate axial extent of the various electrodes we may note first that $$J_0\left(i\frac{\pi}{z_1}r\right)$$

is a quantity which is never negative. Thus to satisfy Equation 6 the term $$\cos \frac{\pi}{z_1} z$$

must, for the electrode 27', be confined to the region $$\frac{\pi}{2} \leq \frac{\pi}{z_1} z \leq \pi$$

and for electrode 25' to the region $$-\pi \leq \frac{\pi}{z_1} z \leq -\frac{\pi}{2}$$

In other words, we see that the electrodes 25' and 27' cover the axial regions between $z=-z_1$ to $$z = -z_1 \text{ to } z = -\frac{z_1}{2}$$

and between $$z = \frac{z_1}{2} \text{ to } z = z_1$$

respectively. The remaining space is occupied by the electrode 26', which asymptotically approaches electrodes 25' and 27' respectively at the regions $$z = -\frac{z_1}{2} \text{ and } z = \frac{z_1}{2}$$

Of course, in a practical construction avoidance of breakdown between the electrodes requires that a significant spacing be left between their extreme edges. The resulting construction is one in which the opposed electrode surfaces are relatively closely adjacent to one another at their outer boundaries and are taperingly recessive with respect to one another as the central axis of the lens system is approached. Each of the active electrode surfaces thus presents the aspect of a flared horn or funnel having the electrode aperture at its throat. In the case of the electrode 26' the two horns merge into the common aperture 28'.

In use, the electrode arrangement of Fig. 1 represents a convergent lens of which the focal length is determined by the dimensions, spacing and potential relationship of the various electrode parts 25, 26 and 27. For the reasons given in the foregoing the field intensity in the vicinity of the apertures 35 and 36 is of zero value so that no aberrations can be introduced by lens effects in these apertures regardless of the question of their symmetry. Accordingly, their size may be chosen extremely small (i. e. with a view to confining the electrons to paths very close to the lens axis, where optical aberrations are at a minimum) without regard to the possibility of resulting distortion of the lens image.

In considering modifications of the preferred construction illustrated in Figs. 1 and 2 it should be observed that the field distribution in the vicinity of the apertures 35 and 36 is determined preponderantly by the configuration of the electrodes 25 and 27 and only to a smaller degree by the configuration of the cooperating electrode 26. Accordingly, considerable departure from the preferred construction of the electrode 26 may be tolerated without losing the benefits of the invention, provided the preferred configuration of the electrodes 25 and 26 or something closely resembling it is preserved. This consideration shows, for example, that a two-element lens having the advantage of substantially lens-free electrode apertures can be constructed in the form illustrated in Fig. 3 in which there is shown a first electrode 40 having a horn-shaped configuration determined by reference to the analytical considerations stated above and a cooperating second electrode 41 which is identical with the electrode 40.

It will be recognized that in so far as the relation of the electrodes 40 and 41 is concerned, the arrangement of Fig. 3 represents an approximation to the first half of the lens construction of Fig. 1. Accordingly, while the electrode 41 cannot be considered the equivalent in all respects of the electrode 26 with reference to its reaction on the electrode 40, nevertheless it may be expected to produce to a substantial degree the favorable field distribution realized in the ideal construction previously described. Moreover, since the electrode 41 is identical with the electrode 40, it is apparent from considerations of symmetry that the aperture in the former electrode will be free of lens effects to the same extent as the aperture in the latter.

A still further aspect of the invention may be understood by reference to Fig. 4 which illustrates on an enlarged scale one half of the electrode construction of Fig. 2 and which represents by means of equi-potential lines $x$ the approximate field distribution existing between the electrodes 25' and 26'. As has been previously explained, the surface of the electrode 26' defines a potential surface at which E equals zero. Similarly, the electrode 25' defines a potential surface at which E equals V. In accordance with well-known principles it is clear that the potential distribution between the electrodes 25' and 26' would not be disturbed if a conducting barrier conforming exactly to any one of the intermediate equipotential surfaces $x$ were substituted for that surface and held at a potential corresponding to that of the surface. For example, let it be assumed that a conducting plate is made to coincide exactly with the equipotential surface $x_1$ (indicated in heavy outline in Fig. 4) and is brought to a potential $E=.6V$, which is the assumed potential level of the surface $x_1$. Under these conditions the electrode 26' may now be withdrawn without disturbing the field distribution between the surface $x_1$ and the opposed surface of the electrode 25'. The resulting combination of elements (i. e. the electrode 25' and the conducting plate at $x_1$) thus represents a system which is the substantial equivalent of that formed by the combination of the electrodes 25' and 26' in so far as the effect produced at the aperture 35' is concerned.

When it is observed that the surface $x_1$, (Fig. 4) being located at the center of the field-producing system, tends to approximate a plane, it will be realized that this indicates the feasibility under appropriate circumstances of replacing an electrode such as 26' (Fig. 4) with a planar electrode such as that which is shown at 50 in Fig. 5. Assuming that the electrodes 50 is located in the optimum position with reference to the taperingly recessive electrode 51, (i. e. in accordance with the principles above stated in connection with Fig. 4), the central aperture 52 of the latter electrode may be expected to be substantially free of lens effects.

In applying Equation 6 to the process of determining the configuration of either the electrode 40 of Fig. 3 or the electrode 51 of Fig. 5 it is apparent that the quantity $z_1$ is now meaningless since this quantity has significance only with reference to a three-electrode system. Equation 6 may therefore be rewritten in the simplified form $$\cos wz \cdot J_0(iwr) = -1 \qquad (8)$$

where $w$ is a perfectly arbitrary constant. In determining an electrode configuration by the use of this equation, $w$ is assigned a value calculated to give practical dimensions to the system, and the equation is then plotted with reference to an arbitrarily chosen origin. The complete electrode surface may then be developed by revolving the resultant generatrix about the $z$ axis. After the form of the cooperating lens electrode is next chosen (e. g. as in Fig. 3 or in Fig. 5), that electrode may be assembled with the first electrode to form a lens. In general, for each configuration chosen there will be a spacing of the electrodes which is optimum from the standpoint of avoiding lens effects in the aperture of the first electrode, and this may be determined either empirically or by extension of the analytical methods outlined above.

It is, of course, not an essential aspect of the invention that the lens electrodes should be of a sheet metal construction as illustrated in the arrangements of Figs. 1 to 5 inclusive. On the contrary, it may prove advantageous in some cases to employ electrodes in the form of solid blocks having their surfaces machined to the desired shape. This modification is illustrated in Fig. 6 which represents a central electrode 56 and a pair of identical complementary electrodes 57 and 58 arranged on opposite sides of the electrode 56. The electrodes 57 and 58 have a common terminal connection 59 by means of which they may be maintained at an appropriate potential difference with respect to the electrode 56, connection to this latter electrode being completed through a terminal 69. The opposed surfaces of the various electrodes are made taperingly recessive in the manner previously described in connection with the construction of Fig. 1. Consequently, the central apertures 62 and 63, which are respectively associated with electrodes 57 and 58, are substantially free of undesirable lens effects.

While the invention has been described by reference to particular embodiments thereof, it will be understood that numerous and further modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. An electron lens including a pair of juxtaposed centrally apertured electrodes adapted to be maintained at a fixed potential difference, one of said electrodes presenting to the other electrode a concave surface of revolution which is symmetrical about the aperture in said one electrode and the generatrix of which is defined at least approximately by the equation $$\cos wz \cdot J_0(iwr) = -1$$

where $w$ is an arbitrary constant and $z$ and $r$ are variable parameters respectively measured parallel to and perpendicular to the longitudinal axis of the lens.

2. A three element electrode system for use in a device which employs a focused beam of electrons, said system comprising a middle electrode having a central opening for the transmission of electrons and a pair of similar complementary electrodes positioned on opposite sides of said middle electrode, each of said complementary electrodes having a horn-shaped surface which is directed toward said middle electrode and which merges into an aperture formed centrally in the complementary electrode in alignment with the said opening in the middle electrode.

3. A three element electron lens which includes a middle electrode having its opposite faces in the form of flared horn surfaces which merge into a central opening extending through the electrode, and a pair of complementary electrodes positioned on opposite sides of said first named electrode, each of said complementary electrodes having a horn-shaped surface which is directed toward the said middle electrode and which merges into an aperture formed centrally in the complementary electrode.

4. An electron lens comprising a middle electrode having a central opening for the transmission of electrons, a pair of complementary electrodes of similar form on opposite sides of the first-named electrode and each having a relatively small central aperture in alignment with the said opening, and terminal connections for maintaining said complementary electrodes at a common potential difference V with respect to said central electrode, said middle electrode presenting to each of said complementary electrodes a concave surface of revolution the generatrix of which is defined at least approximately by the equation $$\cos \frac{\pi}{z_1} z \cdot J_0\left(i\frac{\pi}{z_1}r\right) = \frac{A}{V-A}$$

and each of said complementary electrodes presenting to said central electrode a concave surface of revolution the generatrix of which is defined at least approximately by the equation $$\cos \frac{\pi}{z_1} z \cdot J_0\left(i\frac{\pi}{z_1}r\right) = -1$$

where $z_1$ represents half the spacing of the said apertures, $r$ and $z$ are variable distances measured respectively from the longitudinal axis and from the central transverse plane of the lens, and A is an arbitrary constant having a value between $$\frac{V}{2} \text{ and } V$$

SIMON RAMO.

CERTIFICATE OF CORRECTION.

Patent No. 2,289,071. July 7, 1942.

SIMON RAMO.

It is hereby certified that error appears in the printed specification of the above numbered patent requiring correction as follows: Page 1, first column, line 31, for "characaer" read --character--; line 47, for "construction" read --constructional--; page 2, second column, line 60, at the end of the line, after the equation "B=A-V" insert --(4)--; page 3, first column, line 61, after "between" strike out "$z=-z_1$ to--; and second column, line 14, for "aperture 28'" read --aperture 38'--; page 4, first column, line 33; for "electrodes" read --electrode--; and that the said Letters Patent should be read with this correction therein that the same may conform to the record of the case in the Patent Office.

Signed and sealed this 25th day of August, A. D. 1942.

(Seal)

Henry Van Arsdale,
Acting Commissioner of Patents.